United States Patent [19]
Lindberg et al.

[11] Patent Number: 5,442,696
[45] Date of Patent: Aug. 15, 1995

[54] METHOD AND APPARATUS FOR DETECTING CONTROL SIGNALS

[75] Inventors: Craig R. Lindberg; David J. Thomson, both of Murray Hill, N.J.

[73] Assignee: AT&T Corp., Murray Hill, N.J.

[21] Appl. No.: 816,332

[22] Filed: Dec. 31, 1991

[51] Int. Cl.$^6$ .............................................. H04M 3/00
[52] U.S. Cl. .................................... 379/386; 379/283; 340/825.73
[58] Field of Search ....................... 379/386, 282, 283; 370/110.3; 340/825.39, 825.73, 825.74, 825.76

[56] References Cited

U.S. PATENT DOCUMENTS

| | | | |
|---|---|---|---|
| 3,963,905 | 6/1976 | Gopinath et al. | 235/152 |
| 3,971,998 | 7/1976 | Gopinath et al. | 328/167 |
| 4,018,991 | 4/1977 | Beeman | 179/84 |
| 4,158,110 | 6/1979 | Ullakka et al. | 179/99 |
| 4,211,895 | 7/1980 | Davis et al. | 179/18 |
| 4,223,185 | 9/1980 | Picou | 179/84 |
| 4,328,398 | 5/1982 | Kawaguchi et al. | 179/84 |
| 4,333,156 | 6/1982 | Kurshan et al. | 364/724 |
| 4,348,735 | 9/1982 | Hertz et al. | 364/724 |
| 4,354,248 | 10/1982 | Conger et al. | 364/724 |
| 4,361,875 | 11/1982 | Hertz et al. | 364/724 |
| 4,379,347 | 4/1983 | Girardi et al. | 375/94 |
| 4,611,320 | 9/1986 | Southard | 370/13 |
| 4,613,730 | 9/1986 | Fechalos et al. | 179/81 |
| 4,689,760 | 8/1987 | Lee et al. | 370/110 |
| 4,768,221 | 8/1988 | Green et al. | 379/67 |
| 4,827,500 | 5/1989 | Binkerd et al. | 379/88 |
| 4,833,399 | 5/1989 | So | 324/79 |
| 4,837,799 | 6/1989 | Prohs et al. | 379/224 |
| 4,853,958 | 8/1989 | Rabipour et al. | 379/283 X |
| 4,907,260 | 3/1990 | Prohs et al. | 379/224 |
| 4,914,692 | 4/1990 | Hartwell et al. | 379/410 |
| 4,932,042 | 6/1990 | Baral et al. | 379/88 |
| 4,990,848 | 2/1991 | So | 324/79 |
| 5,218,636 | 6/1993 | Hamilton | 379/386 |
| 5,257,309 | 10/1993 | Brandman et al. | 379/386 X |

FOREIGN PATENT DOCUMENTS

| | | | |
|---|---|---|---|
| 440028A | 8/1991 | European Pat. Off. | 379/283 |
| 60-238984 | 4/1986 | Japan . | |
| 2166925 | 5/1986 | United Kingdom . | |

OTHER PUBLICATIONS

D. Slepian "Prolate Spheroidal Wave Functions, Fourier Analysis, and Uncertainty—V: The Discrete Caste", The Bell System Technical Journal, vol. 57, No. 5, May–Jun. 1978, 1371–1429.

J. R. Boddie, N. Sachs, and J. Tow "Receiver for Touch Tone Service", The Bell System Technical Journal, vol. 60, No. 7, Sep. 1981, 1573–1583.

J. Park, C. R. Lindberg, and D. J. Thomson "Multiple-taper spectral analysis of terrestrial free oscillations: Part I", Geophys. J. R. astr. Soc. 91 (1987), 755–794.

(List continued on next page.)

*Primary Examiner*—James L. Dwyer
*Assistant Examiner*—M. Shehata
*Attorney, Agent, or Firm*—Thomas A. Restaino; Kenneth M. Brown

[57] ABSTRACT

The present invention provides a method and apparatus for detecting control signal information for an element of a communication system. The control signal information is included in one or more segments of a signal communicated over a communication system channel. The invention provides for the application of a plurality of tapers to a segment of a communicated signal; the transformation of a tapered segment; the determination of a similarity score based on a transform of a tapered segment and a model of a control signal; the identification of control signal information based on a similarity score; and the creation of an indicator signal representative of the identified control signal information to the communication system element. The control signal information may comprise a dual-tone multi-frequency signal. The tapers may comprise a discrete prolate spheroidal sequence. A similarity score may be determined based on a ratio of energy distributions. The numerator of the ratio may comprise an energy distribution based on a control signal model, and the denominator of the ratio may comprise an energy distribution based on a difference between a transformed tapered segment and the control signal model.

60 Claims, 5 Drawing Sheets

OTHER PUBLICATIONS

J. Park, C. R. Lindberg, and D. J. Thomson "Multiple-taper spectral analysis of terrestrial free oscillations: Part II", Geophys. J. R. astr. Soc. 91 (1987), 795–836.

D. J. Thomson "Quadratic-Inverse spectrum estimates: applications to paleoclimatology", Phil. Trans R. Soc. Lond. A 332 (1990), 539–597.

D. J. Thomson "Spectrum Estimation and Harmonic Analysis", Proceedings of The IEEE, vol. 70, No. 9, Sep. 1982, 1055–1096.

C. R. Lindberg and F. L. Vernon III "Multitaper Spectral Analysis of High-Frequency Seismograms", Journal of Geophysical Research, vol. 92, No. B12, Nov. 10, 1987, 12,675–12,684.

D. C. Rife and G. A. Vincent "Use of the Discrete Fourier Transform in the Measurement of Frequencies and Levels of Tones", The Bell System Technical Journal, Feb. 1970, 197–228.

B. T. Smith et al. "Lecture Notes in Computer Science", Springer–Verlag (1976), 43–45, 211–219, 448–457.

"Handbook of Mathematical Functions With Formulas, Graphs, and Mathematical Tables", edited by M. Abramowitz and I. A. Stegun, National Bureau of Standards Applied Mathematics Series 55, Nov. 1964, 946–989.

M. Bertocco et al., "A Real Time Procedure for High Resolution Multiple–Tone Detection," IFAC-Identification and System Parameter Estimation '91, vol. 2, 1001–1006, Jul. 1991.

F. J. Harris, "On the Use of Windows for Harmonic Analysis with the Discrete Fourier Transform," Proceedings of the IEEE, vol. 66, No. 1, 51–83, Jan. 1978.

Y. Ikeda et al., "New Realization of Discrete Fourier Transform Applied to Telephone Signaling System CCITT N.5," GLOBECOMM '82—Conference Record, vol. 2/3, D811–D816, Dec. 29, 1982.

METHOD AND APPARATUS FOR DETECTING CONTROL SIGNALS

FIELD OF THE INVENTION

The present invention relates generally to receivers of control signals in a communications system, such as dual-tone multi-frequency receivers in a telephone network, and, more particularly, to the use of spectrum estimation techniques in the detection of such signals.

BACKGROUND OF THE INVENTION

As a result of tests demonstrating that push-button telephones satisfied consumer desire for faster, easier dialing, the American Telephone and Telegraph Company (AT&T ®) began development of its TOUCH-TONE signalling system in the early 1950s. Push-button TOUCH-TONE signalling was originally devised as a replacement for the once-common rotary-dial pulse signalling system. Today, TOUCH-TONE signalling controls not only the switching associated with setting up an ordinary telephone call, but also many advanced features and functions, such as multiple-party teleconferencing (where, e.g., TOUCH-TONES are used to control the addition of a party to an on-going teleconference).

The TOUCH-TONE signalling system uses combinations of "tones" to form control signals representing "dialed" digits. The system provides eight tones (or signal frequencies) divided into two groups—one containing four lower pitch tones, and the other containing four higher pitch tones. Each digit of a telephone number is represented by two simultaneously generated tones—one tone from each group. Since each digit is represented by a pair of tones selected from multiple tones, the TOUCH-TONE system is referred to as the dual-tone multi-frequency (DTMF) signalling system.

The group of lower pitch tones of the DTMF system includes tones of frequencies 697, 770, 852 and 941 Hz. The group of higher pitch tones includes tones of frequencies 1209, 1336, 1447 and 1633 Hz. A total of sixteen DTMF signals can be produced by combining one tone from each group. For example, the DTMF signal representing the digit "five" on a conventional telephone keypad comprises simultaneously generated tones at 770 Hz and 1336 Hz. Conventional telephone keypads are capable of generating 12 of the 16 possible DTMF signals (representing digits 0–9 and symbols # and *), while specialized keypads can generate all 16 DTMF signals (the conventional 12 plus special symbols A, B, C, and D). To identify a digit, a DTMF receiver (or detector) must determine the frequencies present in a DTMF signal and associate with such frequencies the digit they represent.

Typically, DTMF signals are not communicated over dedicated, noise-free channels. Rather, they are often transmitted over ordinary telephone circuits—the same circuits which carry other signals, such as voice, music, or data. If these other signals have certain characteristics in common with DTMF signals, a DTMF receiver may falsely identify them as DTMF signals. False identification may occur when a signal carded over a telephone circuit—for example, a person's voice—includes one tone (or frequency component) from each of the upper and lower DTMF tone groups.

The problem of falsely identifying voice, music and other signals as DTMF signals is known as talk-off. The talk-off problem is not limited to systems which employ DTMF signalling. It affects many types of signalling systems which must operate in the presence of noise.

Historically, talk-off has not presented a significant obstacle to the initiation of telephone calls by DTMF signalling. This is because, for example, people do not usually speak into their telephone handsets (or otherwise intentionally subject telephone circuits to significant noise) when dialing. However, if DTMF signalling is to be used in the presence of noise (e.g., voice, as when adding a party to an on-going teleconference), conventional DTMF receivers may exhibit significant rates of talk-off. Thus, talk-off may be especially troublesome for DTMF signalling occurring during a telephone call, when voice, music or other signals are likely to be present. Because of talk-off, many advanced DTMF signal-controlled features and functions accessible during a call may be improperly initiated or directed, thereby hindering or preventing their beneficial use.

SUMMARY OF THE INVENTION

A method and apparatus for reliably detecting control signals and reducing the frequency of false control signal identification, such as that causing talk-off, are provided by the present invention. The invention operates to apply tapers (or data windows) to received signals and to determine how well transforms of the tapered signals match models of expected control signals. The present invention is applicable to the detection of communication system control signals comprising one or more frequency components such as, e.g., control signals comprising one or more sinusoidal components (such as DTMF signals, call progress signals (e.g., ring and busy signals and dial tones), supervisory audio tone signals (used in, e.g., cellular telephony), and the CCITT (International Telephone and Telegraph Consultative Committee) No. 5 signalling system, among others).

In an illustrative embodiment of the present invention, digital signals which may contain DTMF signals to be detected, as well as other signals, are received and sliced into time segments which may be overlapping. To each of a plurality of copies of a segment is applied one of a plurality of tapers, such as one of the Discrete Prolate Spheroidal Sequences (DPSS). Discrete Fourier Transforms of these tapered segments are determined and combined to form one or more estimates of the distribution of signal energy as a function of frequency. A ratio of best-fit DTMF sinusoidal model energy to model misfit energy is formed for each of the DTMF sinusoidal frequencies. If the value of the ratio exceeds a threshold, there is likely to be a sinusoid at the DTMF tone frequency associated with the quotient and not elsewhere. If sinusoids are found at certain pairs of frequencies (and not elsewhere), DTMF signals may be identified. Additional tests concerning, e.g., tone duration and spacing, may be included in the DTMF signal identification procedure.

DETAILED DESCRIPTION

A. Introduction to the Illustrative Embodiments

A communication system comprises a multiplicity of devices or systems which need to communicate with each other, and a set of one or more channels, coupled to the devices or systems, which facilitate communication. Perhaps the most well-known and widespread of all communication systems are the telecommunication systems, such as telephone networks. These include, for example, local- and long-distance telephone networks (e.g., the AT&T long-distance telephone network), and private branch exchange networks (PBXs) (e.g., the AT&T DEFINITY ® PBXs) used to provide special services to many businesses and institutions. A communication system device which transmits or receives information over the system is referred to as a system station.

Figure 1:
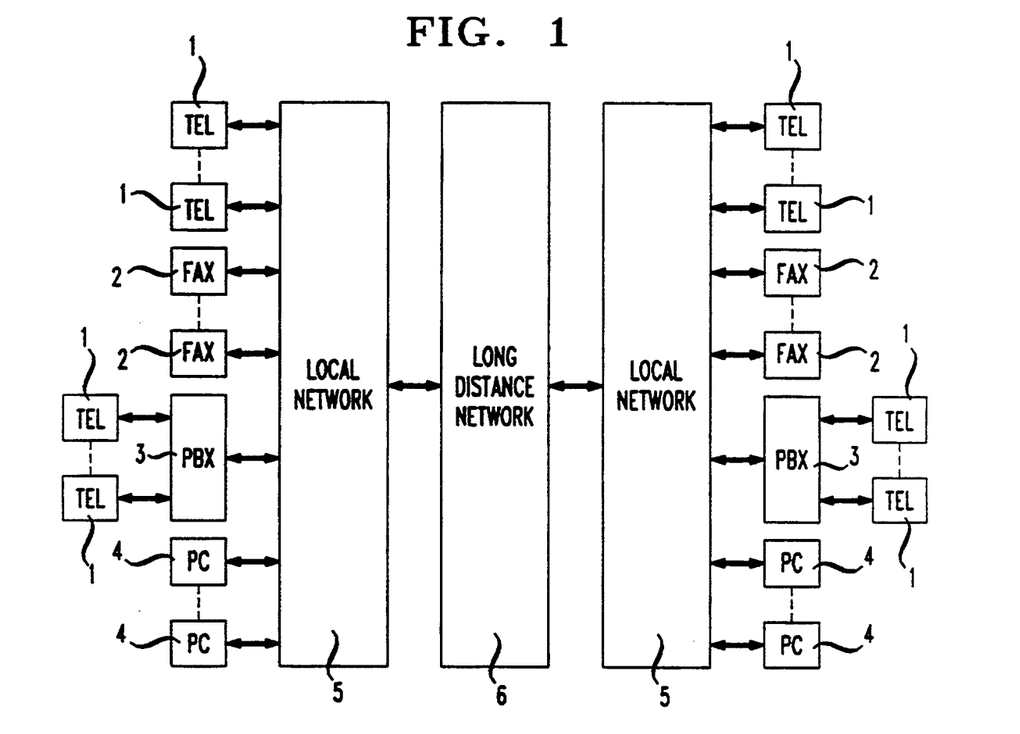
FIG. 1 presents an illustrative telecommunication system comprising a plurality of individual telephone networks.

FIG. 1 presents an illustrative communication system comprising a plurality of individual telephone networks and a collection of stations. The individual telephone networks include PBXs 3, providing features such as a central answering position, station-to-station intercom calling, and connectivity to local and long distance telephone networks; a local-telephone network 5, providing not only services associated with completing local telephone calls and connecting local stations to a long-distance network 6, but also integral services such as, voice-messaging, three-way calling, call-waiting, etc.; and a long-distance network 6, linking individual local networks 5 together and also providing integral services. Stations may include telephones 1, facsimile machines 2, and personal computers 4 (PCs), among other things. The illustrative telecommunication system of FIG. 1 may further comprise, e.g., network switching systems (e.g., the AT&T 4ESS ™ and 5ESS ® switches) network-based teleconferencing (e.g., AT&T Alliance ® Teleconferencing) and messaging (e.g., AT&T Message Service), PBX-based messaging and switching systems, voice transaction systems, etc. Components (or parts thereof) of a communication system may be referred to generically as system elements.

In order for one system element to communicate with another, a system element referred to as a channel must be established. A channel may take the form of a dedicated coupling between elements, or a shared coupling used by several pairs or groups of elements simultaneously. A channel may comprise an electrical coupling, a radio link, a fiber-optic element, an acoustic coupling, etc.

To establish and maintain communication channels (among other things), communication systems (such as telephone networks) may comprise one or more elements referred to as system control functions. A system control function provides control of a communication system element in response to control signals communicated over a channel by another system element. For example, a system control function may control system switching capability directing information flow through a telephone network. That is, a communication channel may be established when a station desiring to initiate communication (a source station) with another station (a target station) transmits control signals over the network identifying the target to one or more system control functions. A system control function, in response, directs the coupling (or switching) of channels to facilitate the desired communication between source and target stations.

In addition to, or instead of, controlling a switching capability, a system control function may control special functions, services, devices, and systems ("systems") which augment or enhance a communication system's basic switching and communication functions. Like a switching capability, these special systems are controlled by a control function in response to control signals. In telephone networks, these special systems might include call-forwarding and -transfer systems, voice-messaging, teleconferencing, transaction systems, etc. (in effect, any function, service, device or system which may be initiated or directed by control signals).

Figure 2:
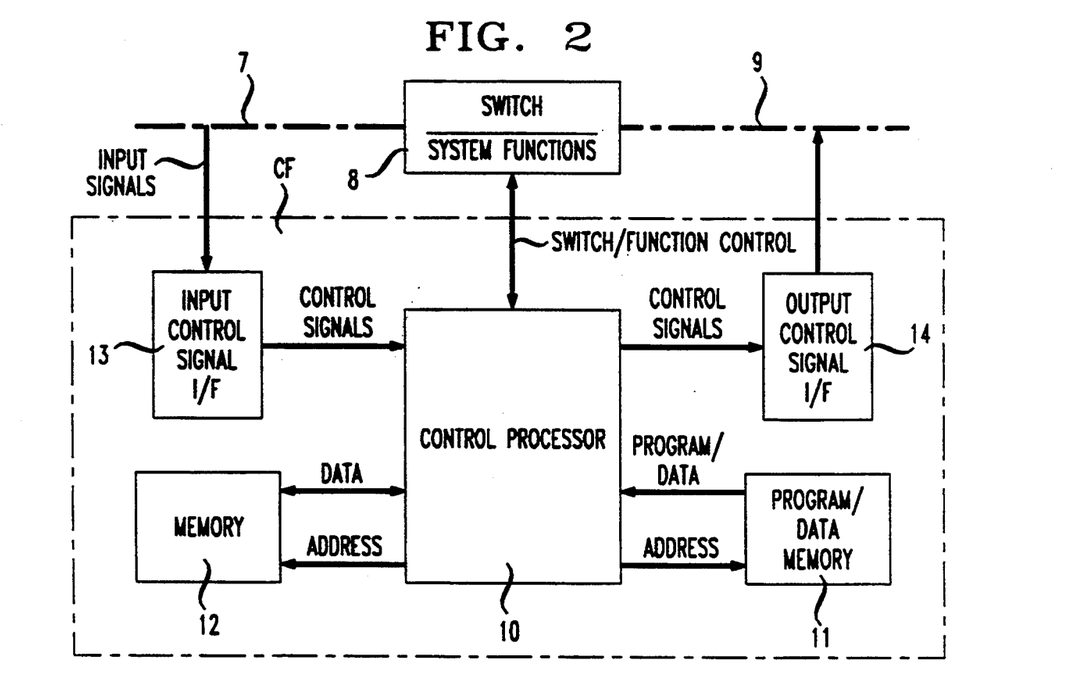
FIG. 2 presents an illustrative control function for the telephone network of FIG. 1.

FIG. 2 presents an illustrative system control function for the telecommunication system of FIG. 1. This control function could be resident anywhere in the telecommunication system where control of switching or special systems is needed (e.g., at a station, at a PBX, in a channel, in a local telephone network, or in a long-distance network). Input to the system control function (CF) are a plurality of network communication channels 7, from a plurality of system elements (not shown). These input channels are also coupled to, e.g., a network switch 8. Switch 8, in turn, is coupled to other (output) channels 9 leading to other system elements (also not shown). Switch 8 may perform the coupling of any of the input channels 7 to any of output channels 9, and may provide special functions, all under the direction of control processor 10 of the system control function.

Control processor 10 of the system control function receives control signals from a system element via input channel 7 and input control signal interface 13. Control signals may comprise, e.g., electrical or Optical signals representative of a telephone number of a target station or a code for a special function desired by a station. Control signals, when detected by control signal interface 13, are passed to control processor 10 to be used as input information for software executed by the processor 10. This software, stored in program memory 11, provides the functionality associated with the system control function. As a result of executing the software, control processor 10 determines other signals necessary to, e.g., facilitate connection of source and target stations, or to provide desired special functions. (To perform its tasks, control processor 10 may employ a scratch pad memory 12 to record and accumulate information during processing. It may also provide the network with control signals, via output signal interface 14, to further facilitate establishment of a communication channel or to provide special functions.)

It is to be understood that the number, types, and configuration of hardware components for the system control function of FIG. 2 is merely illustrative. Other component configurations are possible. For example, a control function not comprising a central processor unit may be provided. Naturally, the present invention is applicable to any control function configuration which requires the detection of communication system control signals.

Control signals received by a telecommunication system control function may take the form of DTMF signals. As discussed above, DTMF signals may be communicated over telephone circuits and therefore may be included with other "noise" signals, such as voice, music, computer data signals, physical noise, and crosstalk from adjacent circuits. The input control signal interface (I/F) 13 is charged with the task of detecting true DTMF control signals in the presence of this noise. In performing this task, the control signal interface 13 should not mistake such noise for valid DTMF control signals (talk-off). To detect true DTMF control signals and avoid talk-off, an input control signal interface may include an illustrative DTMF signal detector according to the present invention, as shown schematically in FIG. 3.

Figure 3:
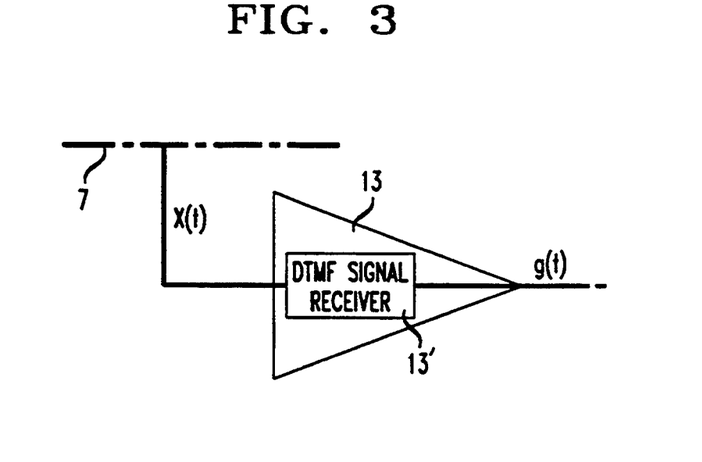
FIG. 3 presents a portion of the control function presented in FIG. 2 concerned with receiving and detecting control signals.

FIG. 3 presents a portion of the control function presented in FIG. 2. Signals, x(t), from input channels 7 are provided to input control signal interface 13 and to an illustrative DTMF signal receiver 13' according to the present invention (other circuitry and components of interface 13 are excluded from FIG. 3 for clarity). As discussed above, signals, x(t), may be, e.g., physical electrical or optical communication signals, typically in digital form, which may include DTMF signal information intended to inspire actual system control, as well as noise (if x(t) is in analog form, it is common that the signals will be converted to digital form prior to DTMF detection). It is the task of illustrative DTMF signal receiver 13' to receive signals, X(t), and to correctly isolate or identify any actual DTMF control signals which may be present in x(t). As a result of identifying a DTMF signal in x(t), illustrative DTMF signal receiver 13' produces other electrical signals, g(t), which represent identified DTMF signals present in x(t). Signals g(t) are then provided to control processor 10 to inspire desired network control. (The switch and special functions described above for telephone networks are illustrative of systems or devices controlled by application of physical control signals. In light of this, the ordinary artisan will understand that the present invention is applicable to many systems and devices which require the identification of physical control signals in the presence of noise.)

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. (Use of the term "processor" should not be construed to refer exclusively to hardware capable of executing software.) Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

As part of the princess of identifying DTMF signals, the illustrative embodiments of the present invention estimate energy distributions of received digitized control signals. A signal's energy spectrum represents the distribution of signal energy as a function of frequency. In general, when determining energy spectra of received control signals, it is desirable to do so in a way which minimizes any mismapping or spurious leakage of energy from one frequency in the spectrum to another. If such leakage is unchecked, a spectrum estimate may misrepresent the energy distribution of a signal and, consequently, obscure true spectral features. To limit leakage in spectrum estimates, the illustrative embodiments of the present invention employ data windows or tapers. Tapers have the effect of concentrating energy around appropriate frequencies in a spectrum (i.e., where the energy actually is), thereby reducing the distortion of true spectral features.

1. Discrete Prolate Spheroidal Sequences as Tapers

Several of the illustrative embodiments of the present invention employ special tapers referred to as Discrete Prolate Spheroidal Sequences (DPSS). These DPSS are especially good at reducing energy leakage in spectrum estimation. While other types of tapers may be employed in embodiments of the present invention, because of the energy-concentrating properties of DPSS tapers, it may be instructive to consider them in some detail.

To simplify notation in this and the following sections, time t has been designated as an index taking on integer values and a unit sampling interval has been assumed, so that $t=0, 1, 2, \ldots, N-1$. The frequencies in the formulae which follow, such as $f_0$, are therefore numbers in the Nyquist band $(-\frac{1}{2}, \frac{1}{2}]$. The bandwidth W of a frequency band is therefore a fraction of the width of the Nyquist band, $0 \leq W \leq \frac{1}{2}$. However, the physical frequencies and bandwidths of the embodiments discussed below are given in Hz, as is conventionally done. To convert a physical frequency of 200 Hz to a frequency $f_0$ as appearing in the formulae below (where data is sampled at a rate of 8000 Hz), $f_0$ is calculated by dividing the physical frequency 200 Hz by the sampling rate, 8000 Hz:

$$f_0 = \frac{200 \ Hz}{8000 \ Hz}.$$

Similarly, a bandwidth of 1000 Hz corresponding to a bandwidth W appearing in the formulae below is calculated as:

$$W = \frac{1000 \ Hz}{8000 \ Hz}.$$

Consider a finite duration sinusoidal signal $A_0 e^{j2\pi f_0 t}$ having a complex amplitude, $A_0$, and a frequency, $f_0$, sampled at discrete times $t=0,1,2, \ldots, N-1$. A Discrete Fourier Transform (DFT) of the signal multiplied by a taper, w(t), is:

$$y(f) = \sum_{t=0}^{N-1} A_0 e^{-i2\pi f 0 t} w(t), \quad (A.1.1)$$

and the energy of the tapered sinusoid is $|y(f)|^2$. The taper, $w(t)$, may be chosen to concentrate most of the energy of the sinusoid within a restricted frequency band, $(f_0-W, f_0+W]$, of a spectral estimate. However, some of the energy of the sinusoid may leak to other portions of the Nyquist band. The total energy of the sinusoid within the Nyquist band, $E_T$, is:

$$E_T = \int_{-1/2}^{1/2} |y(f)|^2 df, \quad (A.1.2)$$

and is the same as the total energy of the tapered signal, $$\sum_{t=0}^{N-1} |x(t)w(t)|^2.$$

Similarly, the energy in the restricted band $(f_0-W, f_0+W]$, $E_R$, is:

$$E_R = \int_{f_0-W}^{f_0+W} |y(f)|^2 df. \quad (A.1.3)$$

The ratio of energy within the restricted band to the total energy in the Nyquist band is referred to as the concentration ratio, $\lambda$:

$$\lambda = \frac{\int_{f_0-W}^{f_0+W} |y(f)|^2 df}{\int_{-1/2}^{1/2} |y(f)|^2 df}, \quad (A.1.4)$$

where $\lambda$, quite naturally, has a maximum theoretical value of one. The better a taper is at concentrating energy in the restricted band, (i.e., reducing leakage), the closer $\lambda$ is to one. Because reduction of energy leakage is desirable for accurate spectrum estimates, "good" tapers are those which maximize $\lambda$. The tapers maximizing equation (A.1.4) are several which satisfy the symmetric, Toeplitz eigenvalue problem:

$$\sum_{t'=0}^{N-1} \frac{\sin 2\pi W(t-t')}{\pi(t-t')} w(t') = \lambda w(t), \quad (A.1.5)$$

where $t=0, 1, 2, \ldots, N-1$. The solutions to this problem are the DPSS, $v_k(t)$, $k=0,1,2,\ldots, N-1$.

A concentration ratio $\lambda_k$ is the eigenvalue corresponding to the eigenvector of order k, $v_k(t)$. The order of the DPSS $v_k(t)$ is defined so that $1 > \lambda_0 > \lambda_1 > \lambda_2 \ldots \lambda_{N-1} > 0$. Moreover, the $\lfloor 2NW \rfloor$ lowest-order DPSS have eigenvalues close to one, and therefore provide good energy concentration within the restricted band (where $\lfloor * \rfloor$ indicates the integer portion of *). A plurality of the DPSS, $v_k(t)$, typically $0 \leq k \leq K-1$ where $0 < K \leq \lfloor 2NW \rfloor$, may be used in combination to provide an accurate estimate of the spectrum of a signal.

Figure 4:
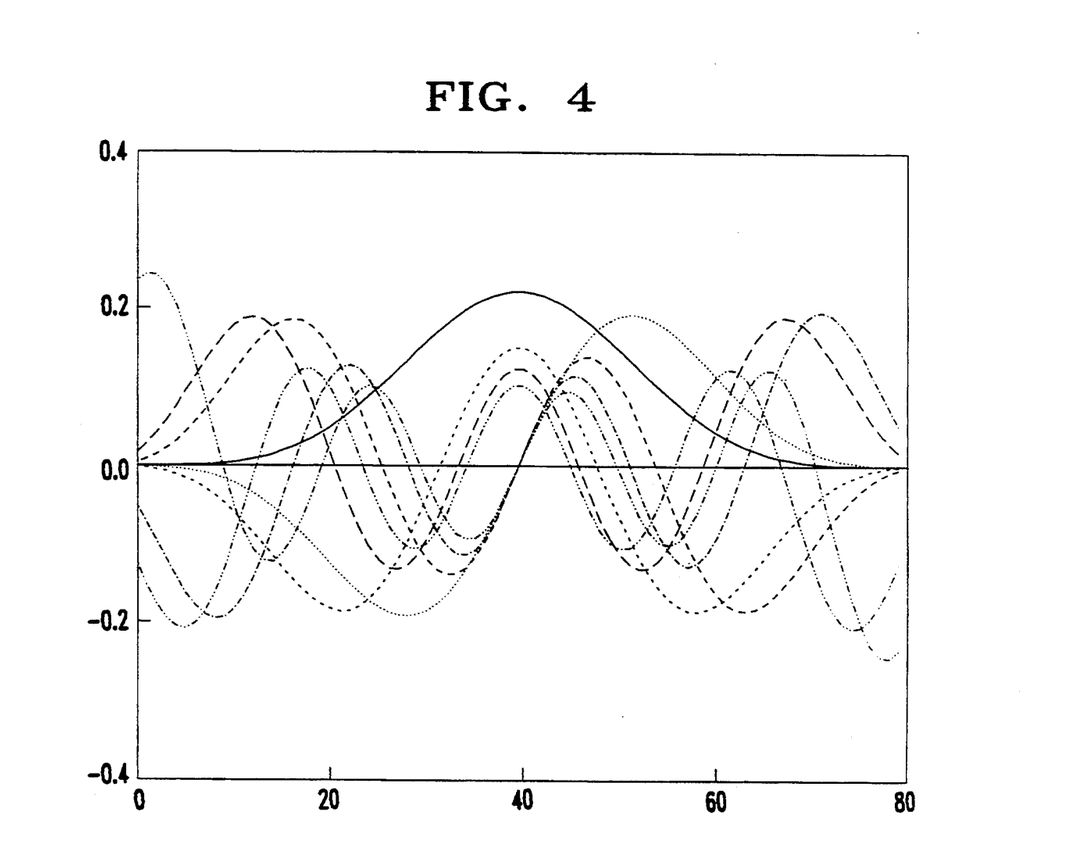
FIG. 4 presents the eight lowest-order discrete prolate spheroidal sequences determined for NW=4.
Figure 5:
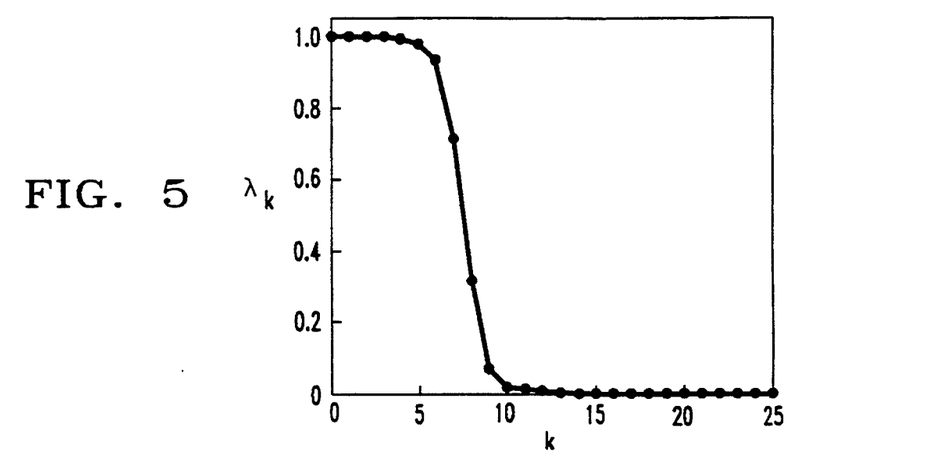
FIG. 5 presents the eigenvalues of discrete prolate spheroidal sequences determined for NW=4.

FIG. 4 presents the eight lowest-order DPSS determined for $NW = 4$. FIG. 5 presents eigenvalues of these DPSS as a function of k. FIG. 5 shows that for $k \leq 7$, the DPSS have eigenvalues, $\lambda_k$, which are greater than or approximately equal to 0.7. Moreover, for $k \leq 5$, $\lambda_k \approx 1$. As such, these first eight DPSS generally, and the six lowest-order DPSS specifically, are very good at concentrating energy and preventing leakage in spectrum estimates. Not all of the DPSS are this good, as FIG. 5 shows for $k \geq 8$ (and especially for $k \geq 10$). However, for $k \leq \lfloor 2NW \rfloor - 1$, values of $\lambda_k$ are generally acceptable for purposes of energy concentration in spectrum estimation.

2. Numerical Evaluation of the DPSS

The DPSS obey the following symmetric tridiagonal eigenvalue equation:

$$\sum_{u=0}^{N-1} S_{tu} v_k(u) = \theta_k v_k(t), \quad (A.2.1)$$

where:

$$S_{tu} = \begin{cases} \frac{1}{2} t(N-t) & u = t-1 \\ (t_o - t)^2 \cos 2\pi W & u = t \\ \frac{1}{2}(t+1)(N-1-t) & u = t+1 \\ 0 & |u-t| > 1 \end{cases} \quad (A.2.2)$$

for $t,u = 0,1,2,\ldots, N-1$, where $$t_o = \frac{N-1}{2},$$

and $\theta_k$ is another eigenvalue associated with $v_k(t)$, as discussed by D. Slepian, *Prolate Spheroidal wave functions, Fourier analysis and uncertainty—V: The discrete case*, 57 Bell System Tech. J., 1371–1429 (1978). The DPSS can be found for a wide range of values of W and N by solving the pair of $$\left[\frac{N+1}{2}\right] \times \left[\frac{N+1}{1}\right]$$

tridiagonal matrix eigenvalue equations of the form (A.2.1) using conventional procedures such as that provided by Smith et al., *Matrix eigensystem routines—EISPACK guide*, Lecture Notes in Computer Science No. 6 (the complete $N \times N$ system need not be solved because the DPSSs are either odd or even about their midpoints at $t = t_0$). Because the DPSS are scaled to have unit energy, $$\sum_{t=0}^{N-1} (v_k(t))^2 = 1,$$

the concentration ratios $\lambda_k$, $k=0,1,2,\ldots, N-1$, can be determined from the sum:

$$\lambda_k = \sum_{t,t'=0}^{N-1} v_k(t) \frac{\sin 2\pi W(t-t')}{\pi(t-t')} v_k(t'). \quad (A.2.3)$$

3. Tapers Other Than the DPSS

In some applications it may be desirable to use sets of tapers other than the DPSS. For example, there are alternative sets of tapers with energy concentration properties which are almost as good as those of the DPSS, such as truncated products of Hermite polynomials with a Gaussian density.

A second class of alternative tapers may be obtained by replacing (A.1.3) in the discussion above with:

$$E_R = \int_{-\frac{1}{2}}^{\frac{1}{2}} |y(f)|^2 S(f) df.$$

where the weighting spectrum S(f) might, for example, contain the average out-of-band energy distribution. This may provide enhanced protection against sources of talk-off having this energy distribution, and may be preferred for environments with identifiable noise characteristics.

A third class of alternative tapers is given by the discrete Karhunen-Lòeve expansion. If process statistics are known accurately, tapers given by the Karhunen-Lòeve (K-L) expansion have the fastest convergence, in a statistical sense, of any possible taper set and give maximum-likelihood estimates.

If the Karhunen-Lòeve expansion is converted to the frequency domain and the frequency domain is restricted as in (A.1.3), the tapers are solutions of the integral equation:

$$\Theta_n \Phi_n(f) = \int_{f_0 - W}^{f_0 + W} S(\xi) \frac{\sin N\pi(f - \xi)}{\sin \pi(f - \xi)} \Phi_n(\xi) d\xi, \quad (A.3.2)$$

where $S(\xi)$ is the power spectrum of the signal causing talk-off. (If $S(\xi)$ is constant in $(f_0-W, f_0+W]$, the K-L tapers are frequency shifted DPSS.) Linear combinations of the discrete prolate spheroidal sequences efficiently approximate the restricted K-L tapers. The hybrid hardware described earlier may be adapted to use this statistical information, wherein the eigen-coefficients are computed by VLSI circuitry and the subsequent processing performed by a DSP. This approach has the advantage that it may be made adaptive: using either the DPSS or the band-limited Karhunen-Lòeve tapers for 'average' speech initially, the eigencoefficients could be transformed to reflect an individual's speech statistics.

B. An Illustrative Multiple Taper DTMF Receiver

Figure 6:
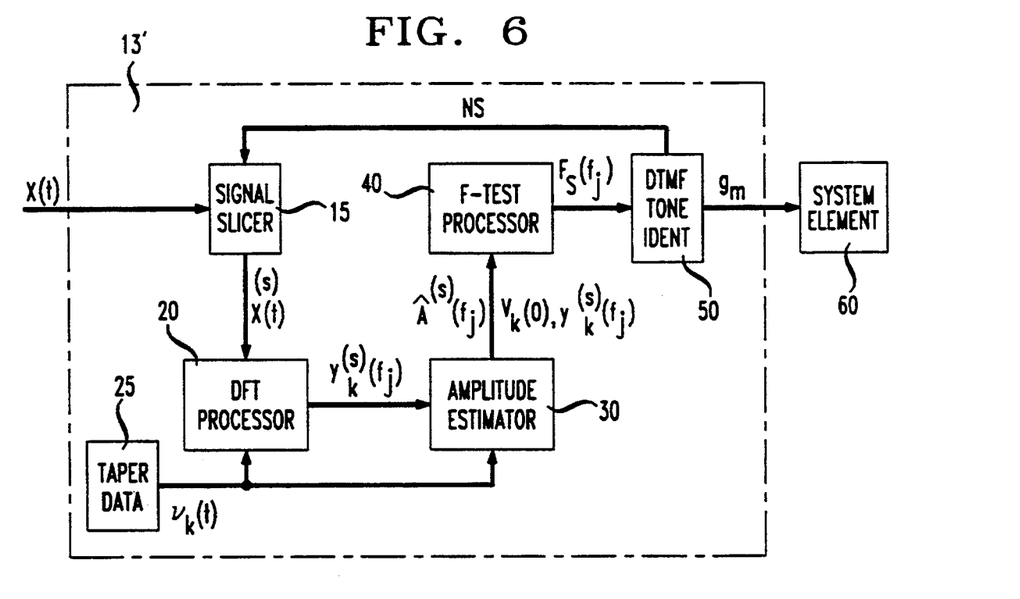
FIG. 6 presents an illustrative DTMF receiver according to the present invention.

An illustrative DTMF receiver 13' according to the present invention for use in, e.g., an input control signal interface 13, is presented in FIG. 6. The receiver comprises a signal slicer 15 (which receives input signals which may contain DTMF signals and provides usable segments thereof), a DFT processor 20 (which applies tapers to the signal segments and computes the DFT of the tapered segments), a memory 25, coupled to DFT processor 20 (for storing taper data used by DFT processor 20), a spectrum amplitude estimator 30 (for estimating the amplitude of a spectrum at specific frequencies), a statistical F-Test processor 40 (for determining the how well the energy of the received signal is explained by a sinusoidal model at a given frequency), and a DTMF signal identifier 50 (which, depending on information received from F-Test processor 40, may provide an output indicative of a particular DTMF signal to a system or device 60 which operates on received DTMF signals). Illustrative software related to this embodiment (written in the "C" programming language) is presented in an Appendix hereto. This software may be executed on conventional hardware platforms, such as, e.g., a SUN ® SPARCstation 1. ®

Figure 7:
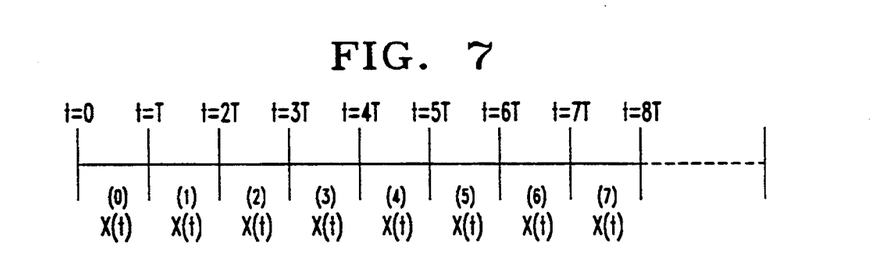
FIG. 7 presents a time progression of signal segments provided by an illustrative embodiment of the present invention.

Signal x(t) is a discrete series of values which may represent, among other things, a DTMF signal. The signal is input to signal slicer 15 which divides this discrete series into sets of contiguous or overlapping signal segments, each comprising N elements. That is, $x^{(s)}(t)$, s=0,1,2, .... FIG. 7 presents a time progression of the segments, $x^{(s)}(t)$, for signal x(t). A signal segment may be contaminated with noise, and a DTMF signal may begin or end any time within a segment. To detect short duration DTMF signals and short inter-digit intervals, a signal segment may be chosen to be less than 30 msec in duration; an illustrative value is 10 msec, corresponding to a segment of about N=80 samples at the standard 8000 Hz telephone system sampling rate.

DFT processor 20 receives signal segments from signal slicer 15 and computes 24 DFTs of length. N from each segment, $x^{(s)}(t)$. Each DFT is of the form:

$$y_k^{(s)}(f_j) = \sum_{t=0}^{N-1} x^{(s)}(t) v_k(t) e^{-i2\pi f_j t}, \quad (B.0.1)$$

where $f_j$, $1 \leq j \leq 8$, represents the eight DTMF tone frequencies, and $v_k(t)$, $0 \leq k \leq 2$, represents the three lowest-order DPSS specified by values for N and W. The resulting values $y_k^{(s)}(f_j)$ are referred to as eigencoefficients and are provided as output from DFT processor 20 to spectrum amplitude estimator 30. (DFT processor 20 may be replaced by a processor performing other transforms such as Laplace, Walsh, etc.) The values of the tapers $v_k(t)$ may be stored in memory 25, which may be, e.g., a semiconductor programmable read-only memory (PROM), and recalled as needed. There is thus a DFI for each of the eight frequencies at which DTMF tones are found and each of the three lowest-order DPSS, yielding 24 DFTs for each segment $x^{(s)}(t)$.

The number of tapers used by the DFT processor 20 is chosen to be the integer portion of 2NW−1. The tapers are determined based on a set of frequencies that include a spectral feature of noise ("noise" being non-DTMF signals) in addition to that which contributes to talk-off. Thus, the bandwidth 2W is chosen wide enough to discriminate between DTMF signals and other signals which may cause talk-off. In this embodiment, a value for W should be chosen such that there can be at most one frequency component from a valid DTMF signal in the range of frequencies $(f_j + W, f_j - W]$ for $1 \leq j \leq 8$. A different value for W may be chosen for each $f_j$. An illustrative value for W for all $f_j$ is 230 Hz/8000 Hz. This allows use of the three lowest-order DPSS (the integer portion of 2NW−1 equals 3, where N=80) and defines bandwidths which avoid dial tone frequencies used in most of North America (for other values of W, it may be useful to eliminate dial tone frequencies with a high-pass filter.

To reduce the number of computations required to determine $y_k^{(s)}(f_j)$, equation (B.0.1) can be implemented by successively summing precomputed values retrieved from memory 25. These precomputed values comprise the application of tapers to all possible values of data. For example, assuming x(t) is an 8-bit µ-law signal, x(t) may take on any of $2^8$ (or 256) possible values. Memory tables for the expression $v_k(t)x(t)e^{-i2\pi f_j t}$ may be precomputed and stored in memory 25 for each k, t, and frequency $f_j$. Values for j, k, t and x(t) may be used to index the tables and retrieve the precomputed values. Since there are only eight DTMF tone frequencies and, for example, three values for k required, only $8 \times 3 \times 2 \times N = 48N$ tables of 256 entries need to be stored (where N is the length of the segment and the factor of two arises due to real and imaginary components). Summing precomputed values to form $y_k^{(s)}(f_j)$ will alleviate much of the computational burden of performing real-time DFTs.

Amplitude estimator 30 receives the eigen-coefficients, $y_k^{(s)}(f_j)$, and determines an estimate of the complex amplitude of a transformed signal segment at the eight defined frequencies at which DTMF tones may be found. At each such frequency, $f_j$, an amplitude estimate in the $s^{th}$ segment, $\hat{A}^{(s)}$, is formed as a weighted sum of the eigen-coefficients:

$$\hat{A}^{(s)}(f_j) = \frac{\sum_{k=0}^{K-1} V_k(0) y_k^{(s)}(f_j)}{\sum_{k=0}^{K-1} (V_k(0))^2}, \quad \text{(B.0.2)}$$

where $$V_k(f) = \sum_{t=0}^{N-1} v_k(t) e^{-i2\pi f t}$$

($V_k(0)$ is the DFT of $v_k(t)$ evaluated at $f=0$) and $K=3$.

Expression (B.0.2) for estimated amplitude, $\hat{A}^{(s)}(f_j)$, is derived by minimizing an expression for model misfit energy:

$$\epsilon^2(f_j) = \sum_{k=0}^{K-1} |y_k(f_j) - A V_k(0)|^2 \quad \text{(B.0.3)}$$

with respect to A at each frequency $f=f_j$. Model misfit energy in the frequency domain represents how a transform of an actual signal, $y_k(f_j)$, differs from a transform of a sinusoidal model of the signal, $A V_k(0)$, where $$V_k(0) = \sum_{t=0}^{N-1} v_k(t).$$

If the signal is accurately represented by a sinusoid at $f_j$, $\epsilon^2(f_j)$ will be small. If not, $\epsilon^2(f_j)$ will be large. The sinusoidal model is useful since DTMF signals to be detected comprise sinusoids. $\hat{A}(f_j)$ is determined by $$\frac{\partial \epsilon^2(f_j)}{\partial A} = 0,$$

and solving for A.

The values of $\hat{A}^{(s)}(f_j)$, $1 \leq j \leq 8$, are provided as output from the amplitude estimator 30 to the statistical F-Test processor 40.

The statistical F-Test processor 40 determines which of the eight DTMF tone frequencies, if any, are present in a group of R successive signal segments in question. It does this by determining values for a test variable, $F_S(f_j)$:

$$F_S(f_j) = \frac{(K-1) \sum_{s=S-(R-1)}^{S} |\hat{A}^{(s)}(f_j)|^2 \sum_{k=0}^{K-1} |V_k(0)|^2}{\sum_{s=S-(R-1)}^{S} \sum_{k=0}^{K-1} |y_k^{(s)}(f_j) - \hat{A}^{(s)}(f_j) V_k(0)|^2} \quad \text{(B.0.4)}$$

where $R=3$, $K=3$ and S is the index of the latest segment. The numerator of the expression for $F_S(f_j)$ represents the energy of a best-fitting sinusoidal model at frequency $f_j$, while the denominator represents the energy associated with the difference between the received signal and the sinusoidal model, sometimes referred to as the misfit energy. If the group of signal segments is well-approximated by the model (i.e., if the received signal actually contains a signal sinusoid at frequency $f_j$), the numerator of $F_S(f_j)$ will be nearly the signal energy, the misfit energy will be small, and the ratio, $F_S(f_j)$, will be large. Conversely, if the model does not match the signal, the modeled (or explained) energy will be small, the misfit energy will be large, and the ratio $F_S(f_j)$ will be small.

The F-Test discussed above (B.0.4) is highly frequency sensitive. That is, $F_S(f_j)$ will tend to be large only when a group of R segments includes a sinusoid at a frequency very close to an expected frequency, $f_j$. Because of DTMF tone generator component tolerances, aging, etc., and telecommunication system-based frequency shifts, DTMF signals may not be communicated exactly at the expected frequencies, $f_j$. Consequently, reduced F-Test frequency sensitivity may be desirable. Moreover, it may be needed to satisfy DTMF system specifications which may require a DTMF receiver to identify tones which are within a certain frequency range about expected frequencies. A segment length of 10 msec provides a relaxation in the F-Test frequency sensitivity, when compared with longer length segments, to allow for variation of $\pm(1.5\% + 2$ Hz) of expected DTMF frequencies, $f_j$.

F-Test processor 40 determines values for $F_S(f_j)$ at each of the four low DTMF tone frequencies (697 Hz, 770 Hz, 852 Hz, and 941 Hz) and each of the four high DTMF tone frequencies (1209 Hz, 1336 Hz, 1447 Hz, and 1633 Hz). Values of $F_S(f_j)$ are output from F-Test processor 40 to a DTMF tone identifier 50.

The DTMF tone identifier 50 receives the values $F_S(f_j)$ and determines whether such values indicate the presence of a DTMF signal. A DTMF signal may be identified when one and only one determined value of $F_S(f_j)$, $1 \leq j \leq 4$, and one and only one determined value of $F_S(f_j)$, $5 \leq j \leq 8$, exceed a selected confidence threshold.

In the absence of a valid DTMF signal, the random variable $F_S(f_j)$ is approximately distributed as a central "F" distribution with 2R and 2R(K−1) degrees of freedom. The confidence thresholds for values of F corresponding to a given number of degrees of freedom can either be calculated or found in a set of statistical tables (e.g., Abramowitz and Stegun, *Handbook of Mathematical Function With Formulas, Graphs and Mathematical Tables*, Ch. 26 (1964)). The DTMF tone identifier 50 can therefore determine, with a desired level of confidence, whether the energy present in a spectrum can be attributed to a sinusoid at a given frequency. For example, if $K=3$, $R=3$, and $F_S(f_j) > 4.82$, a confidence level of 99% is indicated.

If one and only one value of $F_S(f_j)$ associated with each tone group exceeds a confidence threshold, a DTMF signal is identified by DTMF signal identifier 50 as the ordered pair of frequencies, $(f_j^L, f_j^H)$ at which $F_S(f_j)$ exceeds the threshold (where $f_j^L$ is the one frequency at which $F_S(f_j)$, $1 \leq j \leq 4$, exceeds the confidence threshold, and $f_j^H$ is the one frequency at which $F_S(f_j)$, $5 \leq j \leq 8$, exceeds the same threshold). Responsive to identifying a DTMF signal, an indicator signal specifying the DTMF signal, $g_m$, $0 \leq m \leq 15$, is passed to system element 60 which operates in response to the detected DTMF signal. In the illustrative control function presented in FIG. 2, system element 60 comprises control processor 10.

In generating signal $g_m$, DTMF tone identifier 50 may enforce certain requirements regarding DTMF signal length, DTMF signals in consecutive segments, and time gaps between DTMF signals defined by a DTMF system specification. For example, a DTMF system specification may require the rejection of any DTMF signal which is not at least 40 msec in duration. A DTMF system specification may require that when a given DTMF signal is present in consecutive segments, $g_m$ should reflect a single DTMF signal and not a DTMF signal per segment. Also, a system specification may require that when time between consecutive like-DTMF signals is less than a threshold (e.g., 20 msec), the consecutive like-DTMF signals should be treated as a single DTMF signal.

The specific characteristics and form of $g_m$ may be determined by the logical and electrical interface requirements of system element 60. In the context of an illustrative network control function discussed above, these interface requirements may be dictated by control processor 10.

If other than one and only one value of $F_S(f_j)$ for each tone group exceeds the threshold, then DTMF tone identifier 50 will not pass any indicator signal to system element 60.

Regardless of whether a DTMF signal is detected in one or more signal segments, the entire detection process continues in real time. That is, the operation of signal slicer 15, DFT processor 20/memory 25, amplitude estimator 30, F-Test processor 40, and DTMF signal identifier 50 is continued to determine whether subsequent signal segments, $x^{(s)}(t)$, contain DTMF signals. To aid multiplexed applications, DTMF tone identifier 50 may provide a signal, NS, to signal slicer 15 to provide control of the application of signal segments, $x^{(s)}(t)$, to DFT processor 20 for processing.

Although each calculation of $F_S(f_j)$ by F-Test processor 40 requires DFT and amplitude information for each of R consecutive segments, values for $y_k^{(s)}$ and $\hat{A}^{(s)}$, once determined by DFT processor 20 and amplitude estimator 30, respectively, may be stored by F-Test processor 40 for use in subsequent calculations of $F_S(f_j)$.

Figure 8:
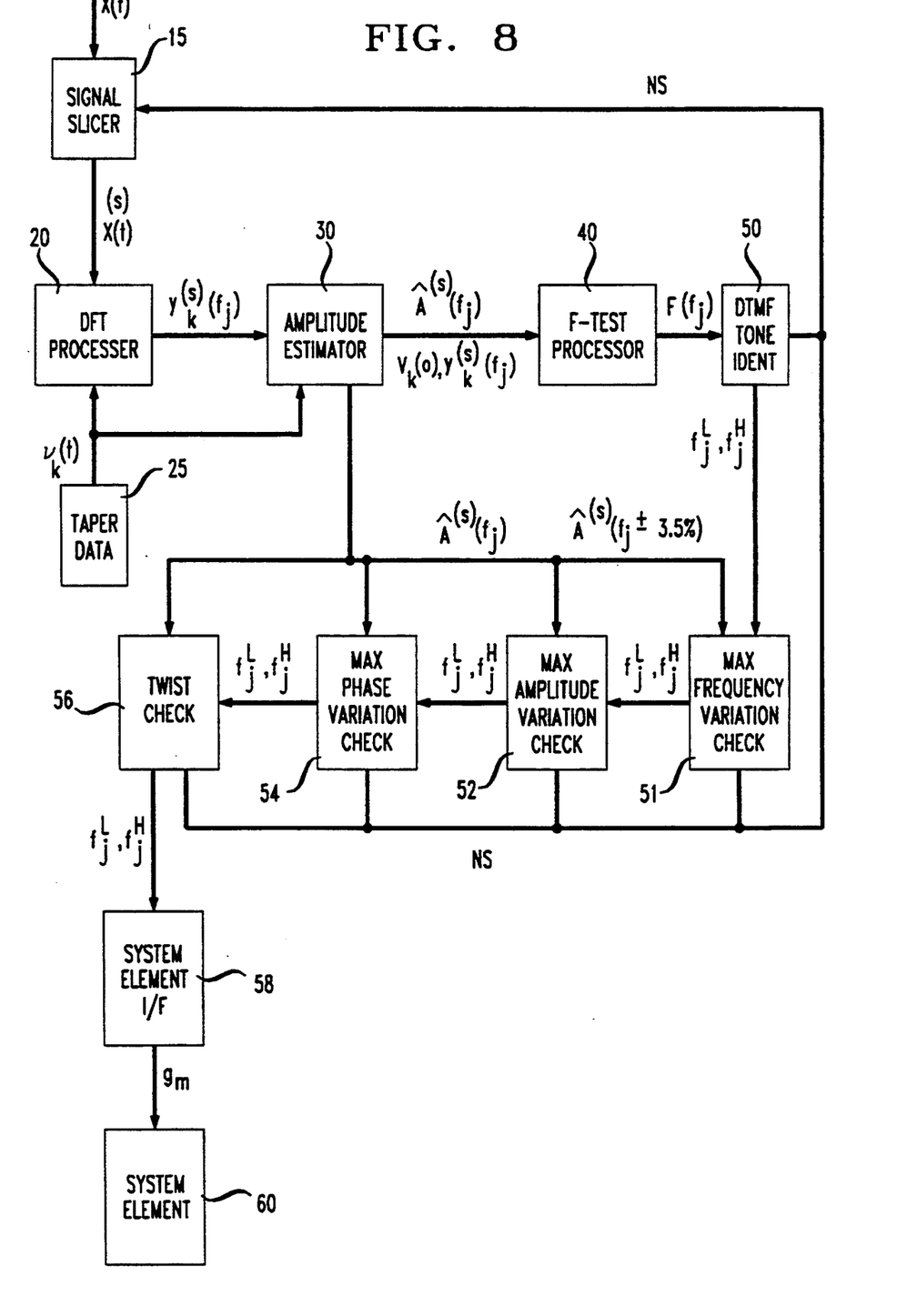
FIG. 8 presents the embodiment presented in FIG. 6 illustratively augmented to provide a maximum frequency variation check, a maximum amplitude variation check, a maximum phase variation check, and a twist check.

The illustrative embodiment discussed above and presented in FIG. 6 may be augmented to provide additional testing of the received signal segments. Such additional testing may be desirable to determine the presence of DTMF signals with even greater certainty, or to satisfy criteria for "good" DTMF signals which may be defined by a DTMF system specification. FIG. 8 presents the embodiment of FIG. 6 illustratively augmented to provide a maximum frequency variation check 51, a maximum amplitude variation check 52, a maximum phase variation check 54, and a twist check 56. This embodiment also includes an interface 58 to provide the requisite logical and electrical compatibility with system element 60, as well as the processing associated with DTMF signal duration, consecutive segments with like-DTMF signals, and inter-signal gaps.

1. Maximum Frequency Variation of DTMF Tones

A DTMF system specification may place requirements on the degree to which DTMF tones can vary from agreed-upon standards and still be accepted as valid. For example, a system specification may provide that a received sinusoid with frequency f shall not be accepted as a valid DTMF tone (with frequency $f_j$) if $|f_j - f| \geq 0.035 f_j$. This requirement can be accomplished by making amplitude estimates not only at frequencies $f_j$, but also at frequencies $1.035 f_j$ and $0.965 f_j$.

As before, a check is made by DTMF tone identifier 50 to see if there is one and only one tone in each of the low and high tone groups. If not, DTMF tone identifier 50 may reject the signal as a non-DTMF signal and notify signal slicer 15 as described above. If there is only one tone in each of these groups as determined by DTMF tone identifier 50 (designated as $f_j^L$ and $f_j^H$ for frequencies in the low and high tone groups, respectively), a check is made by processor 51 to determine whether the estimated amplitudes at both $f_j^L$ and $f_j^H$ are greater than the estimated amplitudes evaluated at frequencies offset by $\pm 3.5\%$ of $f_j^L$ and $f_j^H$, respectively. If so, actual received tones at $f_L$ and $f_H$ are within the $\pm 3.5\%$ requirement and, as such, may be accepted as constituting a valid DTMF signal at $f_j^L, f_j^H$. If not, then the requirement is unsatisfied and no DTMF signal at $f_j^L, f_j^H$ may be recognized. Signal slicer 15 may then be notified by process 51 (via the NS signal) to provide the next signal segment. This test may be conducted for each of the R segments considered (see Appendix).

2. Maximum Amplitude Variation of DTMF Tones

DTMF signal tones exhibit relatively constant amplitude. To help insure the detection of actual DTMF tones, an amplitude consistency check for the R segments considered by F-Test processor 40 may be performed illustratively as follows.

The above-described embodiment of the present invention determines an amplitude estimate for each segment at each DTMF tone frequency, $\hat{A}^{(s)}(f_j)$. Assuming that one tone from the low and high tone groups with frequencies $f_j^L$ and $f_j^H$, respectively, have been identified by DTMF tone identifier 50, an average absolute amplitude over R (e.g., 3) segments at each frequency $f_j^L$ and $f_j^H$ is determined as:

$$\overline{A}(f_j^{L,H}) = \frac{1}{R} \sum_{s=S}^{S-(R-1)} |\hat{A}^{(s)}(f_j^{L,H})|. \quad \text{(B.2.1)}$$

The value $\overline{A}(f_j^{L,H})$ is used by processor 52 to calculate at each frequency a quantity $F_{AMP}(f_j^{L,H})$, which compares average amplitude to an amplitude dispersion between segments:

$$F_{AMP}(f_j^{L,H}) = \frac{(R-1)(\overline{A}(f_j^{L,H}))^2}{\sum_{s=S}^{S-(R-1)} (|\hat{A}^{(s)}(f_j^{L,H})| - \overline{A}(f_j^{L,H}))^2}. \quad \text{(B.2.2)}$$

Because $F_{AMP}(f_j^{L,H})$ is inversely proportional to the dispersion of $|\hat{A}^{(s)}(f_j^{L,H})|$, small values for $F_{AMP}(f_j^{L,H})$ are indicative of a tone with significantly varying amplitude over R segments. Tones $f_j^L, f_j^H$ which vary beyond the degree expected for DTMF tones, but which might otherwise satisfy the F-Test, are rejected by processor 52. Thus, if either of the tones at $f_j^L$ or $f_j^H$ fail this check, no DTMF signal at $f_j^L, f_j^H$ may be identified. Under such circumstances, signal slicer 15 may be notified by processor 52 to provide the next signal segment. A threshold value for $F_{AMP}(f_j^{L,H})$ may be chosen which, if not exceeded, will require rejection of the DTMF signal. An illustrative value for the $F_{AMP}(f_j^{L,H})$ threshold is 2.5.

3. Maximum Phase Variation of DTMF Tones

As with tone amplitude, the phase of a DTMF tone is relatively constant for its duration. To help insure the detection of actual DTMF tones, a maximum phase variation check for the R segments may be performed by processor 54 illustratively as follows.

A value for D (where R=3) is determined by processor 54 for each of the tones identified by F-Test processor 40, $f_j^L$ and $f_j^H$, such that $$D(f_j^{L,H}) = \left| \frac{\hat{A}^{(1)}(f_j^{L,H})}{\hat{A}^{(0)}(f_j^{L,H})} - \frac{\hat{A}^{(2)}(f_j^{L,H})}{\hat{A}^{(1)}(f_j^{L,H})} \right|, \tag{B.3.1}$$

where values for $\hat{A}^{(s)}(f_j^{L,H})$ are complex. (For R>3, similar formulae may be used.) The greater the phase shifts which may be present, the greater the value of D. Tones exhibiting phase shifts which vary beyond the degree expected for DTMF tones, but which might otherwise satisfy the F-Test, are rejected by processor 54. If either of the tones at $f_j^L$ or $f_j^H$ fail this check, no DTMF signal at $f_j^L, f_j^H$ may be identified. As described above, signal slicer 15 may be notified. A threshold value for $D(f_j^{L,H})$ may be chosen which if exceeded shall require rejection of the DTMF signal. Illustrative values for the threshold for D are 0.33 and 1.0.

4. Minimum and Maximum Twist of a DTMF Signal

The specification of a DTMF signalling system may set fairly wide limits on the permissible relative amplitudes of the two tones in a received DTMF signal. These wide limits allow for a phenomenon known as twist, caused by imperfect tone generators in telephone sets and frequency-dependent attenuation in a communications network over which tones are transmitted. If $A_L$ is the amplitude of a lower frequency tone, $f_j^L$, identified by tone identifier 50 and $A_H$ is the amplitude of a higher frequency tone, $f_j^H$, identified by tone identifier 50, a DTMF signalling specification may require that $$-6dB < \frac{|A_L|}{|A_H|} > 8dB,$$

if the pair of tones $f_j^L, f_j^H$ is to be identified as a DTMF signal. Twist check processor 56 determines whether the value of $$\frac{|\hat{A}_L|}{|\hat{A}_H|}$$

falls outside the specified bounds. If so, then the DTMF signal associated with these tones may be rejected and signal slicer 15 may be notified.

C. An Illustrative Embodiment Providing Simultaneous Estimation of Amplitude and Frequency As discussed above, convention provides that an ideal DTMF signal comprises a pair of sinusoids at defined frequencies. As a practical matter, however, tones which form real DTMF signals may deviate slightly from the definitions. Such deviations may be caused by, among other things, imperfectly-tuned DTMF signal generators. Naturally, specifications for DTMF systems may require that small deviations from defined frequencies be accommodated by DTMF receivers. In an embodiment discussed above, small deviations are accommodated through use of short signal segments which have the effect of lessening the frequency selectivity of the F-Test. Below, a further embodiment for accommodating deviations from defined frequencies is described. This embodiment operates to determine an estimate of frequency deviation, in addition to tone amplitude, and reject tones which deviate in frequency beyond an acceptable amount.

Figure 9:
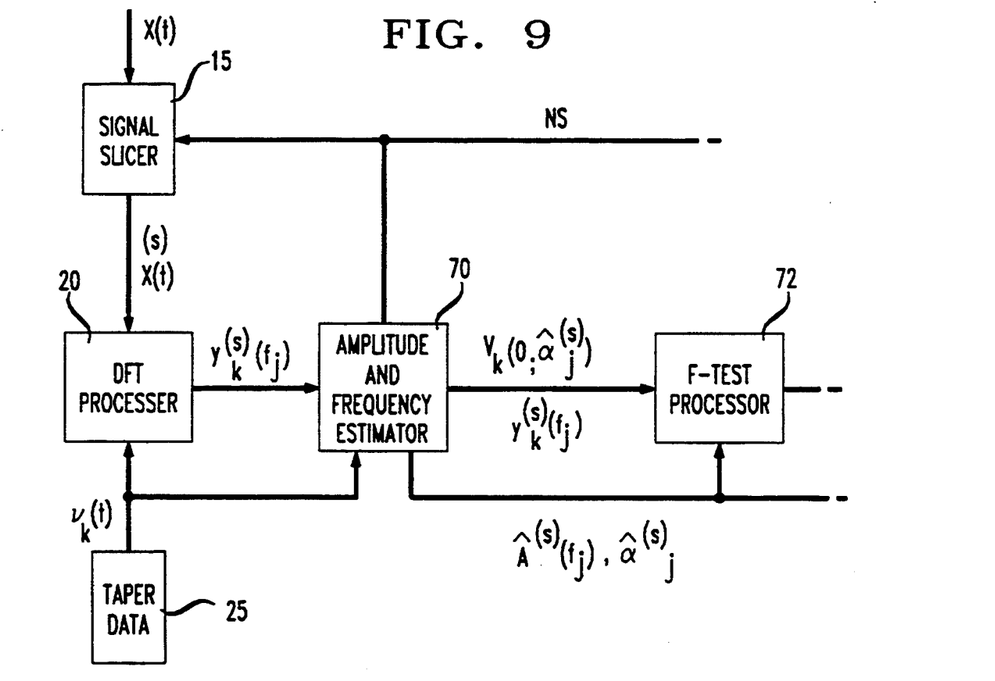
FIG. 9 presents an illustrative embodiment of the present invention which performs a simultaneous estimation of signal amplitude and frequency.

FIG. 9 presents an illustrative embodiment for the contemporaneous estimation of amplitude and frequency. Signal slicer 15, DFT processor 20, and memory 25 are the same as those discussed above. Amplitude and frequency estimator 70 receives eigen-coefficients $y_k^{(s)}(f_j)$ from DFT processor 20 and determines $\hat{A}^{(s)}(f_j)$ as per equation (B.0.2). Using the estimated $\hat{A}^{(s)}(f_j)$, estimator 70 determines an estimate of frequency deviation about $f_j$, $\hat{\alpha}_j^{(s)}$, as follows:

$$\hat{\alpha}_j^{(s)} = \frac{\sum_{k=0}^{K-1} G_k y_k^{(s)}(f_j)}{-2\sum_{k=0}^{K-1} H_k 1 y_k^{(s)}(f_j) + \hat{A}^{(s)}(f_j)\left[\sum_{k=0}^{K-1}|G_k|^2 + 2\sum_{k=0}^{K-1} V_k(0)H_k\right]}, \tag{C.0.1}$$

where $G_k = -i2\pi \sum_{t=0}^{N-1}(t-t_0)v_k(t)$, $H_k = -2\pi^2 \sum_{t=0}^{N-1}(t-t_0)^2 v_k(t)$, and $t_0 = \frac{N-1}{2}$.

Alternatively, an estimate of the frequency offset $\alpha_j$ at segment S may be formed by combining information from segment S and the previous R−1 segments, such as $$\frac{1}{R}\sum_{s=S-(R-1)}^{S} \hat{\alpha}_j^{(s)}.$$

With values for $\hat{\alpha}_j^{(s)}$ and $\hat{A}^{(s)}(f_j)$ determined, estimator 70 determines whether there is at least one tone in each of the high and low DTMF tone groups which is within ±(1.5%+2 Hz) of the defined DTMF tone frequencies, $f_j$. This is done by assessing whether the values for $\hat{\alpha}_j^{(s)}$ are within the required bounds of $f_j$ (such bounds may provide, e.g., that $|\hat{\alpha}_j^{(s)}| < 0.035 f_j$). The processing described below need be performed only for those tones within the required bounds. If there is not at least one tone with $\hat{\alpha}_j^{(s)}$ within the required bounds in both the high and low frequency bands, then processing for the current group of segments may cease and the signal slicer 15 may be notified to provide the next segment.

Once $\hat{\alpha}_j^{(s)}$ is determined, a refined amplitude estimate $\hat{A}^{(s)}(f_j)$ can be determined as follows:

$$A^{(s)}(f_j) = \frac{\sum_{k=0}^{K-1} V_k(0) y_k^{(s)}(f_j) + 862 \, \alpha_j^{(s)} \sum_{k=0}^{K-1} G_k y_k^{(s)}(f_j)}{\sum_{k=0}^{K-1} |V_k(0)|^2}, \quad (C.0.2)$$

or, more accurately, as follows:

$$A^{(s)}(f_j) = \frac{\sum_{k=0}^{K-1} V_k(0; \alpha_j^{(s)}) y_k^{(s)} y_k^{(s)}(f_j)}{\sum_{k=0}^{K-1} |V_k(0; \alpha_j^{(s)})|^2}, \quad (C.0.3)$$

where $V_k(0; \alpha) = \sum_{t=0}^{N-1} v_k(t) e^{j2\pi\alpha(t-t_0)}$.

Often (C.0.2) provides an adequate approximation to $\hat{A}^{(s)}(f_j)$.

F-Test processor 72 determines $F_S(f_j)$ as follows:

$$F_S(f_j) = \frac{(K-1) \sum_{s=S}^{S-(R-1)} |\hat{A}^{(s)}(f_j)|^2 \sum_{k=0}^{K-1} |V_k(0; \hat{\alpha}_j^{(s)})|^2}{\sum_{s=S}^{S-(R-1)} \sum_{k=0}^{K-1} |y_k^{(s)}(f_j) - 862 \hat{A}^{(s)}(f_j) V_k(0; \hat{\alpha}_j^{(s)})|^2}. \quad (C.0.4)$$

This embodiment of the present invention may be augmented as described above with additional processing associated with, e.g, a maximum amplitude variation check 52, a maximum phase variation check 54, and a twist check 56.

Furthermore, the amplitude and phase variation checks, 52 and 54, may be combined since an estimate of the frequency offset in the $s^{th}$ segment $\alpha_j^{(s)}$ is known. Consider an illustrative DTMF receiver designed so that R successive segments of N elements each have to contain a valid DTMF signal for the receiver to determine that a DTMF signal is present. A tone with amplitude B and a frequency near $f_j$ can be represented as:

$$B e^{j2\pi f_j(s)(t+s(N-1))}; \quad t=0,1,2,\ldots N-1 \quad (C.0.5)$$

in the $s^{th}$ segment, where $f_j(s) = f_j + \alpha_j^{(s)}$ is the frequency, and $\alpha_j^{(s)}$ is the frequency offset in the $s^{th}$ segment. The initial amplitude of the tone in the $s^{th}$ segment is $$A_j^{(s)} = B e^{j2\pi s(N-1) f_j(s)}. \quad (C.0.6)$$

The DTMF receiver produces the amplitude estimates $\hat{A}_j^{(s)}$, which can be phase shifted to yield the quantities $\hat{B}^{(s)}$, which are estimates of the amplitude B in the $s^{th}$ segment:

$$\hat{B}^{(s)} = \hat{A}_j^{(s)} e^{-j2\pi s(N-1) f_j(s)} \quad (C.0.7)$$

The true amplitude B can be estimated by an arithmetic average of the $\hat{B}^{(s)}$:

$$\bar{B} = \frac{1}{R} \sum_{s=S}^{S-(R-1)} \hat{B}^{(s)} = \frac{1}{R} \sum_{s=S}^{S-(R-1)} \hat{A}_j^{(s)} e^{-j2\pi s(N-1) f_j(s)} \quad (C.0.8)$$

and the sample variance of the $\hat{B}^{(s)}$, $$\hat{\sigma}_B^2 = \frac{1}{2R-2} \sum_{s=S}^{S(R-1)} |\hat{B}^{(s)} - \bar{B}|^2, \quad (C.0.9)$$

provides a measure of the spread of the random variables $\hat{B}^{(s)}$. The variance ratio $$F_B = \frac{|\bar{B}|^2}{2\hat{\sigma}_B^2} \quad (C.0.10)$$

is roughly F-distributed with 2 and $2R-2$ degrees of freedom. The ratio $F_B$ may be compared with a threshold, illustratively 2.5. When $F_B$ is less than the threshold, the complex amplitude of successive segments is determined to vary more than expected for a DTMF tone and the segment may be rejected.

D. An Illustrative Embodiment Providing Contemporaneous Fit of Two DTMF Tones

Figure 10:
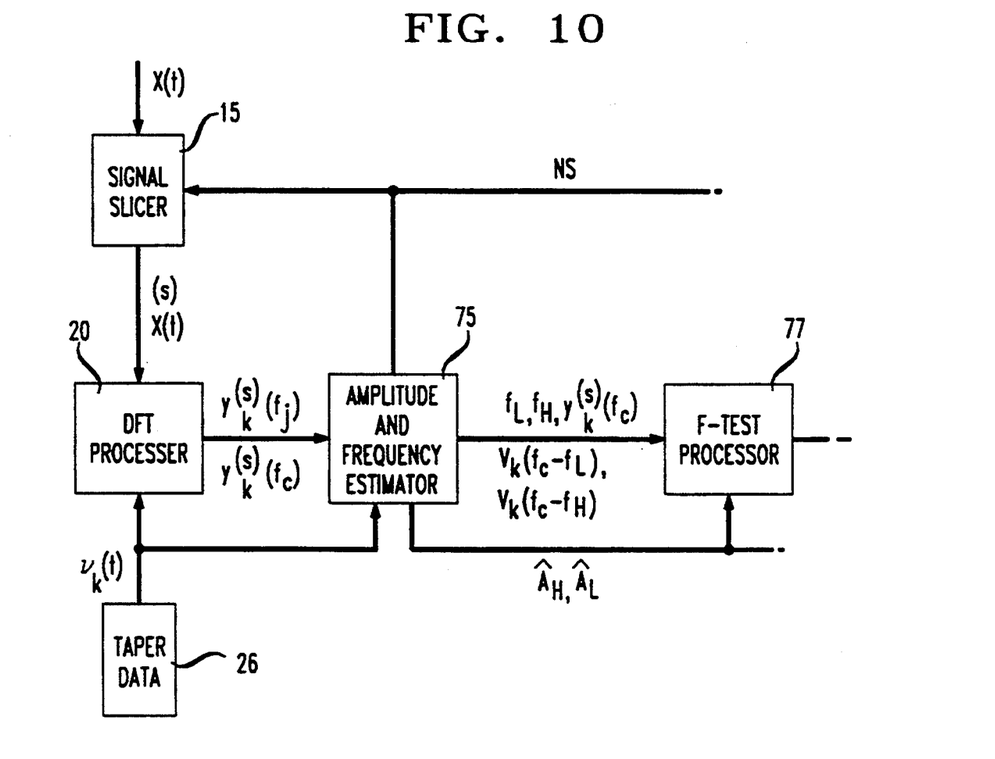
FIG. 10 presents an illustrative embodiment of the present invention which provides for the simultaneous estimation of the amplitudes of two component tones of a DTMF signal.

A further illustrative embodiment of the present invention is presented in FIG. 10. This embodiment provides for the contemporaneous fit (or estimation) of the amplitudes of two tones which may form a DTMF signal. Unlike the embodiments discussed above, where one or more values for W are chosen to define limited bands about defined DTMF tone frequencies $f_j$, the present embodiment provides a frequency band centered about a frequency $f_c$. A value for W is chosen to provide a band about $f_c$ which includes all eight possible DTMF tone frequencies. In the embodiments previously described, a model for DTMF signal energy (employed in the F-Test) concerned a single frequency component in given frequency bands about frequencies $f_j$. In this embodiment, the model for DTMF signal energy includes both frequency components representing the low and high tones of a DTMF signal.

Suppose that a frequency band $[f_c-W, f_c+W]$ is chosen to include all DTMF tone frequencies, $f_j$, and exclude call-progress frequencies, $f_{CP}$ (such as those associated with dial tone (350 Hz and 440 Hz)). For example, such a band may be provided by defining a center frequency of $f_c$ corresponding to 1500 Hz, and a bandwidth of 2W corresponding to 2000 Hz, so that the band extends from 500 to 2500 Hz.

Given values for N and W, a set of DPSS, $v_k(t)$, $k=0,1,2\ldots K-1$, may be determined to concentrate received signal energy within the band. There are at most $\lfloor 2NW \rfloor$ of these sequences (or tapers) which resist leakage. By choosing a wide frequency band, $\lfloor 2NW \rfloor$ may be a dozen or more. For example, if the duration of a signal segment is T=10 msec, and the sampling period is $\tau = 1/8000$Hz, each segment contains $N=T/\tau=80$ samples. If 2W corresponds to 2000 Hz as above, then there are approximately $\lfloor 2NW \rfloor = K = 20$ tapers that have useful leakage properties (i.e., concentration ratios, $\lambda_k$, approximately equal to one). Values for the 20 tapers may be determined as described above and stored in memory 26 along with the values for tapers as described above for W corresponding 230 Hz.

As with the embodiments described above, a signal which may contain a DTMF signal, x(t), is provided to signal slicer 15, which in turn provides signal segments $x^{(s)}(t)$. These segments are passed to DFT processor 20 which determines eigen-coefficients, $y_k^{(s)}(f_j)$, by performing DFTs as described above using the tapers retrieved from memory 26.

The eigen-coefficients, $y_k^{(s)}(f_j)$, are provided to amplitude and frequency estimator 75. In addition, a set of coefficients, $y_k^{(s)}(f_c)$, are determined for later use. Amplitude and frequency estimator 75 determines amplitude estimates, $\hat{A}^{(s)}(f_j)$, as per equation (B.0.2), and estimates of frequency deviation about $f_j$, $\hat{\alpha}_j^{(s)}$, as per equation (C.0.1). With values of $\hat{\alpha}_j^{(s)}$ computed, estimator 75 determines whether there is one and only one tone in each of the low and high DTMF tone groups within $\pm(1.5\% + 2\text{ Hz})$ of the defined DTMF tone frequencies, $f_j$, referred to as $f_j^L$ and $f_j^H$, respectively. This is done, as in section C, by assessing whether values for $\hat{a}_j^{(s)}$ are within the required bounds of $f_j$, applying a preliminary F-Test of the form (C.0.4), performing phase and amplitude checks, and a twist check. If other than two single tones (one in each band) are identified, processing of the current segment may cease and the signal slicer 15 may be notified. Otherwise, the following processing may be performed.

Estimator 75 determines estimates of the frequency of the identified single tones by summing the appropriate values of $f_j$, i.e., $f_j^H$ and $f_j^L$, with associated values of $\hat{a}_j^{(s)}, \hat{a}_j^{(s)L}$ and $\hat{a}_j^{(s)H}$:

$$f_L^{(s)} = f_j^L + \hat{a}_j^{(s)L} \tag{D.0.1}$$

$$f_H^{(s)} = f_j^H + \hat{a}_j^{(s)H} \tag{D.0.2}$$

With frequency estimates determined, estimator 75 determines estimates of amplitude at these frequencies in the segment s:

$$\hat{A}_L^{(s)} = \frac{1}{D} \sum_{k,l=0}^{K-1} y_k^{(s)}(f_c)\{V_k^*(f_c - F_L^{(s)})|V_l(f_c - f_H^{(s)})|^2 - V_k^*(f_c - f_H^{(s)})V_l(f_c - f_H^{(s)})V_l^*(f_c - f_L^{(s)})\} \tag{D.0.3}$$

$$\hat{A}_H^{(s)} = \frac{1}{D} \sum_{k,l=0}^{K-1} y_k^{(s)}(f_c)\{V_k^*(f_c - F_H^{(s)})|V_l(f_c - f_L^{(s)})|^2 - V_k^*(f_c - f_L^{(s)})V_l(f_c - f_H^{(s)})V_l^*(f_c - f_H^{(s)})\} \tag{D.0.4}$$

where * represents a complex conjugate and $$D = \sum_{k,l=0}^{K-1} |V_k(f_c - f_L^{(s)})|^2 |V_l(f_c - f_H^{(s)})|^2 - \sum_{k,l=0}^{K-1} V_k(f_c - f_H^{(s)})V_l^*(f_c - f_L^{(s)})V_l^*(f_c - f_H^{(s)}). \tag{D.0.5}$$

With values for $\hat{A}_L^{(s)}$ and $\hat{A}_H^{(s)}$ determined, F-Test processor 77 may determine a value for $F^{(s)}$ as follows:

$$F^{(s)} = \frac{(K-2)}{2} \frac{|.862\,\hat{A}_L^{(s)}|^2 \sum_{k=0}^{K-1} |V_k(f_c - f_L^{(s)})|^2 + |\hat{A}_H^{(s)}|^2 \sum_{k=0}^{K-1} |v_k(f_c - f_H^{(s)})|^2}{\sum_{k=0}^{K-1} |y_k^{(s)}(f_c) - \hat{A}_L^{(s)}V_k(f_c - f_L^{(s)}) - \hat{A}_H^{(s)}V_k(f_c - f_H^{(s)})|^2}, \tag{D.0.6}$$

which is F-distributed with 4 and $2K-4$ degrees of freedom, and is a measure of how well the $s^{th}$ segment fits the DTMF model. If a segment is associated with a small value of $F^{(s)}$, then it probably does not contain a valid DTMF signal. On the other hand, if the segment is associated with a large value of $F^{(s)}$, the segment would more probably be associated with true DTMF signals. As in sections B and C, the sensitivity of (D.0.6) may be enhanced by averaging both numerator and denominator of (D.0.6) over R segments. As with the embodiments discussed above, additional tests may be performed to augment this embodiment.

This matrix-based test, although useful in low signal-to-noise environments, may take more processing time than other DTMF tests. Therefore, while it may be used generally, it may also be appropriate to limit its use to deciding intermediate cases that arise only rarely. The F-Test can be made more discriminating by increasing the bandwidth 2W, as long as this does not cause tones which are a natural part of a telephone system, such as call progress tones, to intrude on the frequency band $[f_c - W, f_c + W]$. If this occurs, steps can be taken to make this test useful. For example, the model can be expanded to include the call progress tones, and the amplitudes of these call progress tones can be determined. However, this may increase the size of the matrix problem that must be solved and lead to increased complexity and slower processing.

E. DTMF Signal Distortion

DTMF receivers may be confronted with DTMF signals which suffer from distortion, either due m problems with a DTMF tone generator, or because of distortion created by a network. For example DTMF tones may not have constant frequency, but may suffer from phenomena known as frequency drift or chirp. Some telephones may produce DTMF tones which are amplitude modulated, making a single DTMF signal appear like several repeated DTMF signals. Furthermore, non-linearities in either a DTMF tone generator or a network may result in significant intermodulation components in a DTMF signal. Distortion may also take the form of clipping or quantization error. If these sources of distortion are severe, real DTMF signals may be rejected by a DTMF receiver at an unacceptable rate.

In the context of the present invention, these problems may be addressed by relaxing the rejection thresholds associated with various tests. This, of course, may increase talk-off events. A balance may therefore need to be struck in receiver design given the severity of the distortion experienced.

Alternatively, identified distortion may be introduced into the models of DTMF signals used by the F-Test. Tuning the F-Test in this fashion may avoid increasing talk-off events at the expense of complexity.

We claim:

1. A method of discriminating control signal information from non-control signal information, the control signal information for use by a communication system element, the control signal information and the non-control signal information included in one or more segments of a signal communicated over a communication system channel, the control signal information comprising signal components at one or more predetermined control signal frequencies, the non-control signal information comprising signal components at one or more information signal frequencies, the method comprising the steps of:
   applying a plurality of tapers to a segment of a communicated signal;
   performing a transform of a tapered segment;
   determining a similarity score based on a transform of a tapered segment and a model of a control signal, the similarity score reflecting a comparison of signal components of the communicated signal at the predetermined control signal frequencies with signal components of the communicated signal at other information signal frequencies;

classifying one or more segments of the communicated signal as representing either control signal information or non-control signal information based on a similarity score; and providing an indicator signal representative of control signal information to the communication system element when the communicated signal has been classified as representing control signal information.

2. The method of claim 1 further comprising the step of receiving a communicated signal and producing one or more segments thereof.

3. The method of claim 2 wherein the step of producing one or more segments comprises the step of producing overlapping segments.

4. The method of claim 1 wherein the control signal information comprises DTMF signal information.

5. The method of claim 1 wherein the control signal information comprises call progress signal information.

6. The method of claim 1 wherein the control signal information comprises supervisory audio tone signal information.

7. The method of claim 1 wherein the step of applying a plurality of tapers comprises the step of applying a taper which comprises a discrete prolate spheroidal sequence.

8. The method of claim 1 wherein the step of applying a plurality of tapers comprises the step of forming a product of a taper value and an input signal segment value.

9. The method of claim 1 wherein the step of applying a plurality of tapers comprises the step of applying a taper value to a possible communicated signal value.

10. The method of claim 9 further comprising the step of storing in memory information which comprises a taper value applied to a possible communicated signal value.

11. The method of claim 1 wherein the step of performing a transform comprises the step of performing a Fourier transform.

12. The method of claim 1 wherein the model of a control signal comprises a sinusoidal model.

13. The method of claim 12 wherein the sinusoidal model comprises an amplitude modulated sinusoidal model.

14. The method of claim 12 wherein the sinusoidal model comprises a frequency modulated sinusoidal model.

15. The method of claim 12 wherein the sinusoidal model comprises a first sinusoidal model and a second sinusoidal model.

16. The method of claim 15 wherein the first sinusoidal model comprises a first control signal information frequency and the second sinusoidal model comprises a second control signal information frequency.

17. The method of claim 16 wherein the step of determining a similarity score comprises the step of estimating amplitude information based on a transformed tapered segment and wherein each of the first and second sinusoidal models comprises estimated amplitude information.

18. The method of claim 17 wherein the step of determining a similarity score comprises the step of forming a ratio, the numerator of the ratio comprising an energy distribution based on the first and second sinusoidal models, and the denominator of the ratio comprising an energy distribution based on a difference between a transformed tapered segment and a sum of the first and second sinusoidal models.

19. The method of claim 1 wherein the model of a control signal comprises expected control signal information distortion.

20. The method of claim 1 wherein the step of determining a similarity score comprises the step of estimating amplitude information based on a transformed tapered segment and wherein a model of a control signal comprises estimated amplitude information.

21. The method of claim 1 wherein the step of determining a similarity score comprises the step of determining a measure of similarity between energy distributions.

22. The method of claim 21 wherein the step of determining a measure of similarity between energy distributions comprises the step of forming a ratio, the numerator of the ratio comprising an energy distribution based on a control signal model, and the denominator of the ratio comprising an energy distribution based on a difference between a transformed tapered segment and the control signal model.

23. The method of claim 1 wherein the step of determining a similarity score comprises the step of:

determining an estimate of frequency deviation between an expected control signal information frequency and a frequency component of a transformed tapered segment; and determining whether the estimate of frequency deviation exceeds a threshold.

24. The method of claim 1 wherein the classifying step comprises the step of determining whether a similarity score exceeds a threshold.

25. The method of claim 1 wherein the classifying step comprises the step of determining whether a frequency component of a transformed tapered segment deviates from an expected control signal information frequency by an amount which exceeds a threshold.

26. The method of claim 25 wherein the step of determining whether a frequency component of a transformed tapered segment deviates from an expected control signal information frequency comprises the steps of:

determining amplitude estimates of the transformed tapered segment at a plurality of frequencies including the expected control signal information frequency; and determining whether the amplitude at the expected control signal information frequency exceeds the other determined amplitude estimates.

27. The method of claim 1 wherein the classifying step comprises the steps of:

determining an amplitude variation parameter based on estimates of the amplitude of a frequency component present in each of a plurality of segments; and determining when the amplitude variation parameter exceeds a threshold.

28. The method of claim 1 wherein the classifying step comprises the steps of:

determining a phase variation parameter based on estimates of the amplitude of a frequency component present in each of a plurality of segments; and determining when the phase variation parameter exceeds a threshold.

29. The method of claim 1 wherein the classifying step comprises the steps of:
- determining an amplitude and phase variation parameter based on estimates of the amplitude and phase of a frequency component present in each of a plurality of segments; and
- determining when the amplitude and phase variation parameter exceeds threshold.

30. The method of claim 1 wherein the classifying step comprises the steps of:
- determining a ratio of amplitudes of a transformed tapered segment, the numerator of the ratio comprising an amplitude evaluated at one frequency of expected control signal information and the denominator of the ratio comprising an amplitude evaluated at another frequency of the expected control signal information; and
- determining whether the ratio is within a predetermined range of values.

31. An apparatus for discriminating control signal information from non-control signal information, the control signal information for use by a communication system element, the control signal information and the non-control signal information included in one or more segments of a signal communicated over a communication system channel, the control signal information comprising signal components at one or more predetermined control signal frequencies, the non-control signal information comprising signal components at one or more information signal frequencies, the apparatus comprising:
- means for applying a plurality of tapers to a segment of a communicated signal;
- means for performing a transform of a tapered segment;
- means for determining a similarity score based on a transform of a tapered segment and a model of a control signal, the similarity score reflecting a comparison of signal components of the communicated signal at the predetermined control signal frequencies with signal components of the communicated signal at other information signal frequencies;
- means for classifying one or more segments of the communicated signal as representing either control signal information or non-control signal information based on a similarity score; and
- means for providing an indicator signal representative of control signal information to the communication system element when the communicated signal has been classified as representing control signal information.

32. The apparatus of claim 31 further comprising a means for receiving a communicated signal and producing one or more segments thereof.

33. The apparatus of claim 32 wherein the means for producing one or more segments comprises means for producing overlapping segments.

34. The apparatus of claim 31 wherein the control signal information comprises DTMF signal information.

35. The apparatus of claim 31 wherein the control signal information comprises call progress signal information.

36. The apparatus of claim 31 wherein the control signal information comprises supervisory audio tone signal information.

37. The apparatus of claim 31 wherein the means for applying a plurality of tapers comprises a means for applying a taper which comprises a discrete prolate spheroidal sequence.

38. The apparatus of claim 31 wherein the means for applying a plurality of tapers comprises a means for forming a product of a taper value and an input signal segment value.

39. The apparatus of claim 31 wherein the means for applying a plurality of tapers comprises a means for applying a taper value to a possible communicated signal value.

40. The apparatus of claim 39 further comprising a memory for storing information which comprises a taper value applied to a possible communicated signal value.

41. The apparatus of claim 31 wherein the means for performing a transform comprises a means for performing a Fourier transform.

42. The apparatus of claim 31 wherein the control signal model comprises a sinusoidal model.

43. The apparatus of claim 42 wherein the sinusoidal model comprises an amplitude modulated sinusoidal model.

44. The apparatus of claim 42 wherein the sinusoidal model comprises a frequency modulated sinusoidal model.

45. The apparatus of claim 42 wherein the sinusoidal model comprises a first sinusoidal model and a second sinusoidal model.

46. The apparatus of claim 45 wherein the first sinusoidal model comprises a first control signal information frequency and the second sinusoidal model comprises a second control signal information frequency.

47. The apparatus of claim 46 wherein the means for determining a similarity score comprises means for estimating amplitude information based on a transformed tapered segment and wherein each of the first and second sinusoidal models comprises estimated amplitude information.

48. The apparatus of claim 47 wherein the means for determining a similarity score comprises means for forming a ratio, the numerator of the ratio comprising an energy distribution based on the first and second sinusoidal models, and the denominator of the ratio comprising an energy distribution based on a difference between a transformed tapered segment and a sum of the first and second sinusoidal models.

49. The apparatus of claim 31 wherein the control signal model comprises expected control signal information distortion.

50. The apparatus of claim 31 wherein the means for determining a similarity score comprises a means for estimating amplitude information based on a transformed tapered segment and wherein a control signal model comprises estimated amplitude information.

51. The apparatus of claim 31 wherein the means for determining a similarity score comprises means for determining a measure of similarity between energy distributions.

52. The apparatus of claim 51 wherein the means for determining a measure of similarity between energy distributions comprises means for forming a ratio, the numerator of the ratio comprising an energy distribution based on a control signal model, and the denominator of the ratio comprising an energy distribution based on a difference between a transformed tapered segment and the control signal model.

53. The apparatus of claim 31 wherein the means for determining a similarity score comprises:

means for determining an estimate of frequency deviation between an expected control signal information frequency and a frequency component of a transformed tapered segment; and means for determining whether the estimate of frequency deviation exceeds a threshold.

54. The apparatus of claim 31 wherein the means for classifying comprises means for determining whether a similarity score exceeds a threshold.

55. The apparatus of claim 31 wherein the means for classifying comprises means for determining whether a frequency component of a transformed tapered segment deviates from an expected control signal information frequency by an amount which exceeds a threshold.

56. The apparatus of claim 55 wherein the means for determining whether a frequency-component of a transformed tapered segment deviates from an expected control signal information frequency comprises:

means for determining amplitude estimates of the transformed tapered segment at a plurality of frequencies including the expected control signal information frequency; and means for determining whether the amplitude at the expected control signal information frequency exceeds the other determined amplitude estimates.

57. The apparatus of claim 31 wherein the means for classifying comprises:

means for determining an amplitude variation parameter based on estimates of the amplitude of a frequency component present in each of a plurality of segments; and means for determining when the amplitude variation parameter exceeds a threshold.

58. The apparatus of claim 31 wherein the means for classifying comprises:

means for determining a phase variation parameter based on estimates of the amplitude of a frequency component present in each of a plurality of segments; and means for determining when the phase variation parameter exceeds a threshold.

59. The apparatus of claim 31 wherein the means for classifying comprises:

means for determining an amplitude and phase variation parameter based on estimates of the amplitude and phase of a frequency component present in each of a plurality of segments; and means for determining when the amplitude and phase variation parameter exceeds a threshold.

60. The apparatus of claim 31 wherein the means for classifying comprises:

means for determining a ratio of amplitudes of a transformed tapered segment, the numerator of the ratio comprising an amplitude evaluated at one frequency of expected control signal information and the denominator of the ratio comprising an amplitude evaluated at another frequency of the expected control signal information; and means for determining whether the ratio is within a predetermined range of values.

* * * * *